(12) United States Patent
Okamoto

(10) Patent No.: US 11,302,958 B2
(45) Date of Patent: Apr. 12, 2022

(54) METHOD AND APPARATUS FOR PRODUCING ALL-SOLID-STATE BATTERY

(71) Applicant: HITACHI ZOSEN CORPORATION, Osaka (JP)

(72) Inventor: Kenji Okamoto, Osaka (JP)

(73) Assignee: Hitachi Zosen Corporation, Osaka (JP)

( * ) Notice: Subject to any disclaimer, the term of this patent is extended or adjusted under 35 U.S.C. 154(b) by 0 days.

(21) Appl. No.: 16/471,389

(22) PCT Filed: Dec. 15, 2017

(86) PCT No.: PCT/JP2017/045112
§ 371 (c)(1),
(2) Date: Aug. 26, 2019

(87) PCT Pub. No.: WO2018/116983
PCT Pub. Date: Jun. 28, 2018

(65) Prior Publication Data
US 2019/0386339 A1 Dec. 19, 2019

(30) Foreign Application Priority Data
Dec. 22, 2016 (JP) .............................. JP2016-248538

(51) Int. Cl.
*H01M 10/0562* (2010.01)
*H01M 10/0585* (2010.01)
*H01M 4/139* (2010.01)
*H01M 4/64* (2006.01)
*H01M 10/04* (2006.01)
*H01M 4/04* (2006.01)

(52) U.S. Cl.
CPC ....... *H01M 10/0562* (2013.01); *H01M 4/139* (2013.01); *H01M 4/64* (2013.01);
(Continued)

(58) Field of Classification Search
CPC ......... H01M 10/0562; H01M 10/0585; H01M 10/0481; H01M 10/0565; H01M 4/139;
(Continued)

(56) References Cited

U.S. PATENT DOCUMENTS

| 2009/0269670 A1* | 10/2009 | Tsuchida | ................. | H01M 4/13 |
| | | | | 429/231.95 |
| 2012/0052382 A1* | 3/2012 | Yoshida | ................ | H01M 4/043 |
| | | | | 429/211 |

(Continued)

FOREIGN PATENT DOCUMENTS

| CN | 104900888 A | 9/2015 |
| JP | 2000-317696 A | 11/2000 |

(Continued)

OTHER PUBLICATIONS

International Search Report dated Feb. 13, 2018 issued in corresponding International Patent Application No. PCT/JP2017/045112 with English translation.

(Continued)

*Primary Examiner* — Matthew W Van Oudenaren
(74) *Attorney, Agent, or Firm* — Pillsbury Winthrop Shaw Pittman, LLP

(57) ABSTRACT

Provided is a method for producing an all-solid-state battery, which is capable of preventing the occurrence of a short circuit or a charge abnormality due to the formation of a dendrite even in cases where the pressing force is decreased. In the method for producing an all-solid-state battery, a solid electrolyte layer is arranged between a positive electrode layer and a negative electrode layer and current collectors are connected to the positive electrode layer and the negative electrode layer, respectively. This method for producing an all-solid-state battery is characterized by comprising: a step for forming at least one powder film for constituting the positive electrode layer, the negative electrode layer and/or (Continued)

the solid electrolyte layer, and a step for pressing a surface of the powder film by a pressing body consisting of an elastic body.

10 Claims, 13 Drawing Sheets

(52) U.S. Cl.
CPC ........ *H01M 10/0585* (2013.01); *H01M 4/043* (2013.01); *H01M 10/0404* (2013.01); *H01M 2300/0065* (2013.01)

(58) Field of Classification Search
CPC .. H01M 4/64; H01M 4/13; H01M 2300/0065; H01M 10/0404; H01M 4/043; H01M 4/0433; B30B 15/024; B30B 15/022
See application file for complete search history.

(56) References Cited

U.S. PATENT DOCUMENTS

| | | |
|---|---|---|
| 2013/0065123 A1 | 3/2013 | Tsuchida |
| 2013/0143128 A1* | 6/2013 | Mochida ............. H01M 10/052 429/304 |
| 2015/0255805 A1 | 9/2015 | Tanaka et al. |
| 2016/0158974 A1* | 6/2016 | Wang ...................... B29C 43/02 264/405 |

FOREIGN PATENT DOCUMENTS

| | | |
|---|---|---|
| JP | 2011-159635 A | 8/2011 |
| JP | 2013-020837 A | 1/2013 |
| JP | 2014-222564 A | 11/2014 |
| JP | 2014222564 | * 11/2014 |
| WO | WO2014201913 | * 12/2014 |

OTHER PUBLICATIONS

Extended European Search Report dated Jan. 23, 2020 issued in corresponding European Patent Application No. 17884710.9.
Notice of Reasons for Refusal dated Mar. 23, 2021, issued in corresponding Japanese Patent Application No. 2018-557739 with English translation (6 pgs.).
First Office Action dated Oct. 26, 2021, issued in corresponding Chinese Patent Application No. 2017800796821 with English translation (10 pgs.).

* cited by examiner

METHOD AND APPARATUS FOR PRODUCING ALL-SOLID-STATE BATTERY

CROSS-REFERENCE TO RELATED APPLICATIONS

This Application is the U.S. National Stage of PCT/JP2017/045112, filed Dec. 15, 2017, which claims priority to Japanese Patent Application No. 2016-248538, filed Dec. 22, 2016, the contents of each of which are incorporated herein by reference in entirety.

TECHNICAL FIELD

The present invention relates to a method and apparatus for producing an all-solid-state battery.

BACKGROUND ART

There is an already widely known all-solid-state battery in which a solid electrolyte layer is arranged between a positive electrode layer and a negative electrode layer, and current collectors are arranged on the positive electrode layer and the negative electrode layer, respectively. There is an also known method in which at least one of the positive electrode layer, the negative electrode layer and the solid electrolyte layer is formed into a film using a powder material and then it is pressurized to produce a layer (for example, Patent Literature 1).

PRIOR DOCUMENT

Patent Literature

Patent Literature 1: JP2013-20837A

SUMMARY OF INVENTION

Technical Problem

When at least one of the positive electrode layer, the negative electrode layer and the solid electrolyte layer of the all-solid-state battery is formed into a layer using a powder material, as shown in FIG. 23, there may be a case where the uneven parts 51a and 52a are formed on the surface of a layer of pressed powder (positive electrode layer 51 and solid electrolyte layer 52). In this case, as shown in FIG. 24, at the point A where the boundary surface between the positive electrode layer 51 and the solid electrolyte layer 52 and the boundary surface between the solid electrolyte layer 52 and a negative electrode layer 53 are brought close to each other, there is a risk that a short circuit may occur or a charging abnormality caused by a close proximity may occur.

To address such cases, the uneven part 51a (52a) can be eliminated by pressing the film surface with a large pressure using a flat press pin 60 or the like as shown in FIG. 25 whenever each of the layer of pressed powder of the all-solid-state battery is formed. However, pressing with a large pressure causes a problem of occurrence of curvature of the produced (formed) layer due to the influence of residual stress or the like (briefly shown in FIG. 26).

Therefore, the pressure of the pressing can be reduced (made small) so as not to cause such a problem to minimize the curvature phenomenon. However, as shown in FIG. 27, there is a problem of causing a part where the flat press pin 60 does not contact with the uneven part 51a, leaving the uneven part 51a intact in this part. Consequently, short circuit or a charging abnormality may occur due to the generation of dendrite (tree-like crystal) due to lithium concentration on the convex part.

The present invention solves the above problems, and an object of the present invention is to provide a production method of an all-solid-state battery capable of preventing the occurrence of short circuit and charging abnormality even when the pressing force is reduced.

Solution to Problem

In order to solve the above problems, a production method of an all-solid-state battery wherein a solid electrolyte layer is arranged between a positive electrode layer and a negative electrode layer and current collectors are arranged on the positive electrode layer and the negative electrode layer respectively, includes:

forming at least one powder film for constituting the positive electrode layer, the negative electrode layer and/or the solid electrolyte layer; and pressing a surface of the powder film by a pressing body consisting of an elastic body.

According to this method, the surface of the powder film is pressed by the pressing body consisting of the elastic body in the pressing, and thereby the elastic body can contribute to reducing the level difference of the uneven part of the surface of the powder film even in the case where the uneven part is generated on the surface of the powder film and the pressing pressure is reduced (made small). As a result, even when the pressing force in the pressing reduced, the variation of the thickness of the solid electrolyte layer between the positive electrode layer and the negative electrode layer can be well minimized, preventing short circuit and charging abnormality. Since the pressing force in the pressing can be reduced, the occurrence of curvature of the formed layer of pressed powder can also be minimized.

Advantageous Effects of Invention

According to the present invention, the surface of the formed powder film is pressed (subjected to press) by a pressing body consisting of an elastic body, and thereby the pressing operation is performed while the elastic body is elastically deformed so that the level difference of the uneven part of the surface of the powder film is reduced even when the uneven part is generated on the surface of the battery component layer, and the level difference of the uneven part of the surface of the layer of pressed powder can be reduced. As a result, the variation in the thickness of the solid electrolyte layer between the positive electrode layer and the negative electrode layer can be favorably minimized, and when the pressing force reduced, it is possible to suppress short circuit and prevent the occurrence of a charge abnormality due to the generation of dendrite (tree-like crystal) due to lithium concentration on the convex part. Since the pressing force reduced, the occurrence of curvature of the formed layer can be minimized, thereby preventing cracking of the formed powder layer (positive electrode layer, solid electrolyte layer, and/or negative electrode layer) due to deformation.

DESCRIPTION OF EMBODIMENTS

Hereinafter, the production method of an all-solid-state battery according to the embodiments of the present invention is described based on drawings.

Figure 1:
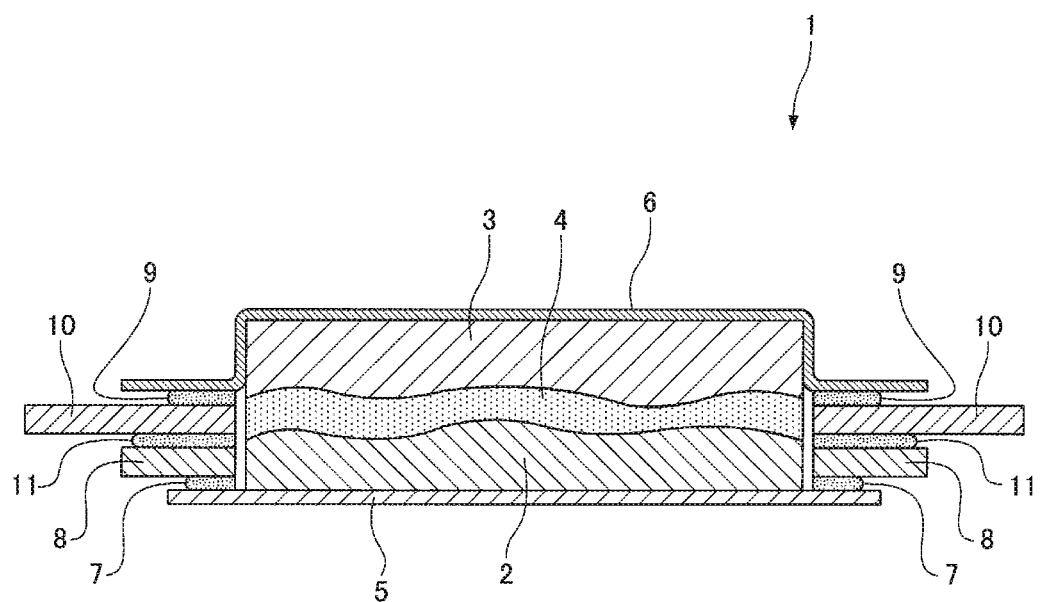
FIG. 1 is a cross-sectional view of the all-solid-state battery according to the embodiment of the present invention.

The structure of the all-solid-state battery is described with FIG. 1. As shown in FIG. 1, the all-solid-state battery 1 is configured such that the solid electrolyte layer 4 is arranged between the positive electrode layer 2 and the negative electrode layer 3. Current collectors (positive electrode collector 5 and negative electrode collector 6) are arranged and connected to the outer surfaces of the positive electrode layer 2 and the negative electrode layer 3, respectively. Since the positive electrode layer 2, the negative electrode layer 3, and the solid electrolyte layer 4 are each formed by pressing a film of a powder and these layers constitute the all-solid-state battery 1, these layers are referred to as layer of pressed powder. In this embodiment, the positive electrode layer 2 is referred to as the first layer of pressed powder, the solid electrolyte layer 4 as the second layer of pressed powder, and the negative electrode layer 3 as the third layer of pressed powder.

In this embodiment, the positive electrode layer 2, the solid electrolyte layer 4, and the negative electrode layer 3 are arranged in this order from the bottom on the positive electrode collector 5, and the negative electrode layer 3 is covered (arranged) with the negative electrode collector 6 thereon. An insulating material 8 in the side of the positive electrode is fixed to the outer peripheral portion of the positive electrode layer 2 on the upper surface of the positive electrode collector 5 by an adhesive 7. An insulating material 10 in the side of the negative electrode is fixed to the outer peripheral portion of the solid electrolyte layer 4 on the lower surface of the negative electrode collector 6 by an adhesive 9. The insulating material 8 in the side of the positive electrode and the insulating material 10 in the side of the negative electrode are fixed through an adhesive 11.

In the drawings (such as FIG. 1) according to this embodiment, to easily understand the purpose of the invention, the unevenness in the thickness direction of the positive electrode layer 2, the solid electrolyte layer 4, and the negative electrode layer 3 are shown in an exaggerated manner in a large size. Of course, the size of the unevenness is not limited to the above size in the thickness direction.

Materials and the like of each layer of pressed powder for constituting the all-solid-state battery 1 is described.

Examples of the material of the positive electrode collector 5 and the negative electrode collector 6 include a plate body or a foil body consisting of copper (Cu), magnesium (Mg), stainless steel, titanium (Ti), iron (Fe), cobalt (Co), nickel (Ni), zinc (Zn), aluminum (Al), germanium (Ge), indium (In), lithium (Li), tin (Sn), or alloys thereof. In the present embodiment, an aluminum foil is employed as the positive electrode collector 5, and a copper foil is employed as the negative electrode collector 6.

As a powder material for forming the positive electrode layer 2, a mixed material of a positive electrode active material and a lithium ion conductive solid electrolyte is used, or a positive electrode active material is used singly. As the positive electrode active material suitable for the positive electrode layer 2, those used as the positive electrode active material in the battery field can be used without particular limitation.

Examples of the positive electrode active material include oxides such as lithium-nickel composite oxide ($LiNi_xM_{1-x}O_2$), lithium cobaltate ($LiCoO_2$), lithium nickelate ($LiNiO_2$), lithium-nickel-cobalt-aluminum composite oxide ($LiNi_{0.8}Co_{0.15}Al_{0.95}O_2$, NCA layered oxide), lithium manganate (such as spinel lithium manganate $LiMn_2O_4$), and Li excess composite oxide ($Li_2MnO_3$—$LiMO_2$) and compounds other than oxides. Examples of compounds other than oxides include olivine compounds ($LiMPO_4$), sulfur-containing compounds (such as $Li_2S$), and the like. In the above formulae, M represents a transition metal. The positive electrode active materials can be used singly or in combination of two or more. From the viewpoint of easily obtaining a high capacity, a lithium-containing oxide containing at least one selected from the group consisting of Co, Ni, and Mn is preferable. The lithium-containing oxide may further include a typical metal element such as Al.

The surface of the positive electrode active material may be coated with a coating material from the viewpoint of improving rate characteristics. Specific examples of the coating material include $Li_4Ti_5O_{12}$, $LiTaO_3$, $Li_4NbO_3$, $LiAlO_2$, $Li_2ZrO_3$, $Li_2WO_4$, $Li_2TiO_3$, $Li_2B_4O_7$, $Li_3PO_4$, $Li_2MoO_4$, $LiBO_2$, alumina ($Al_2O_3$), carbon (C), and the like.

As the solid electrolyte layer 4, a lithium ion conductive solid electrolyte is used. The solid electrolyte is roughly classified into an organic polymer electrolyte (also referred to as organic solid electrolyte), an inorganic solid electrolyte, and the like, but any solid electrolyte may be used. The inorganic solid electrolyte is roughly classified into oxide materials and sulfide materials, but any of the materials may be used. Furthermore the inorganic solid electrolyte can be appropriately selected from crystalline or amorphous ones. The solid electrolyte can be appropriately selected from materials consisting of an organic compound, an inorganic compound, or a mixture thereof. Specific examples of the material capable of being used as the solid electrolyte include a lithium-containing metal oxide (including one or more metals) such as $Li_2$—$SiO_2$, $Li_2$—$SiO_2$—$P_2O_5$, or the like; a lithium-containing metal nitride such as $Li_xPyO_{1-z}N_2$; a lithium-containing sulfide lass such as $Li_2S$—$P_2S_5$ system, $Li_2S$—$SiS_2$—$SiS_2$ system, $Li_2S$—$B_2S_3$ system, $Li_2S$—$GeS_2$ system, $Li_2S$—$SiS_2$—$LiI$ system, $Li_2S$—$SiS_2$—$Li_3PO_4$ system, $Li_2S$—$Ge_2S_2$ system, $Li_2S$—$GeS_2$—$P_2S_5$ system, or $Li_2S$—$GeS_2$—$ZnS$ system; PEO (polyethylene oxide); PVDF (polyvinylidene fluoride); lithium phosphate ($Li_3PO_4$); and a lithium-containing transition metal oxide such as lithium titanium oxide. As the inorganic solid electrolyte, a sulfide (sulfide inorganic solid electrolyte) is preferable. As the sulfide, for example, a sulfide including $Li_2S$ and one or more sulfide that contains at least one element selected from the group consisting of group 13 elements, group 14 elements and group 15 elements of the periodic table is preferable. The periodic table group 13 to 15 elements are not particularly limited, and examples thereof include P, Si, Ge, As, Sb and Al, in which P, Si and Ge are preferable and P is particularly preferable. The sulfide including these elements (especially, P) and Li are also preferable.

On the other hand, as the negative electrode layer 3, a mixed material of a negative electrode active material and a lithium ion conductive solid electrolyte is used, or the negative electrode active material is used singly. The negative electrode active material is not particularly limited as long as lithium ions can be intercalated and deintercalated, and the known negative electrode active material used in all-solid-state battery can be utilized. Examples of the negative electrode active material include carbonaceous materials capable of intercalating and deintercalating lithium ions, and simple substances of metals or semimetals, alloys, compounds, and the like capable of intercalating and deintercalating lithium ions. Examples of the carbonaceous material include graphite (such as natural graphite and artificial graphite), hard carbon, amorphous carbon, and the like. Examples of simple substances of metals or semimetals and alloys include lithium metals or alloys thereof, a simple substance of Si, and the like. Examples of the compound include oxides, sulfides, nitrides, hydrates, silicides (such as lithium silicide), and the like. Examples of the oxide include titanium oxide and silicon oxide. The negative electrode active material may be used singly or in combination of two or more. For example, silicon oxide and carbonaceous material may be used in combination.

Since the solid electrolyte such as a sulfide inorganic solid electrolyte is highly flexible and has the property of sticking when pressurized, the positive electrode layer 2, the solid electrolyte layer 4, and the negative electrode layer 3 are finally overlapped and pressed (subjected to press) to form the all-solid-state battery 1 integrally solidified. As described below, the all-solid-state battery 1 of the present embodiment is a battery obtained by forming each of the positive electrode layer 2 consisting of a positive electrode powder material (positive electrode mixture powder layer), the solid electrolyte layer 4 consisting of a solid electrolyte powder material, and the negative electrode layer 3 consisting of a negative electrode powder material (positive electrode mixture powder layer) and pressing these layers on a composite collector formed by bonding a current collector (in the present embodiment, the positive electrode collector 5) and an insulating material (in the present embodiment, the insulating material 8 in the side of the positive electrode) and then by sandwiching it with another type of composite collectors (in the present embodiment, the negative electrode collector 6) and performing press molding. The all-solid-state battery 1 of the present embodiment has the structure packaged by providing an adhesive layer between these two types of composite collectors (that is, between the positive electrode collector 5 and the negative electrode collector 6).

Figure 2:
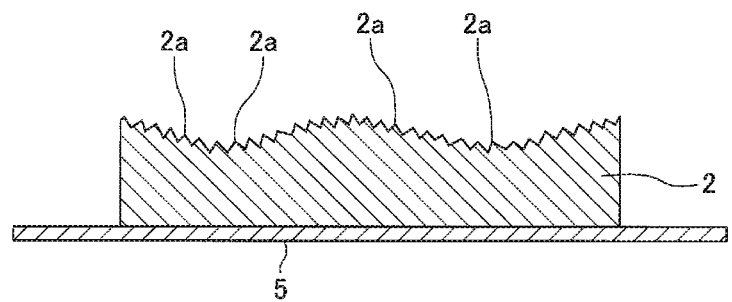
FIG. 2 is a cross-sectional view showing the production method of the all-solid-state battery wherein a powder material for the positive electrode layer is laminated and formed on the positive electrode collector (step of forming positive electrode film).
Figure 3:
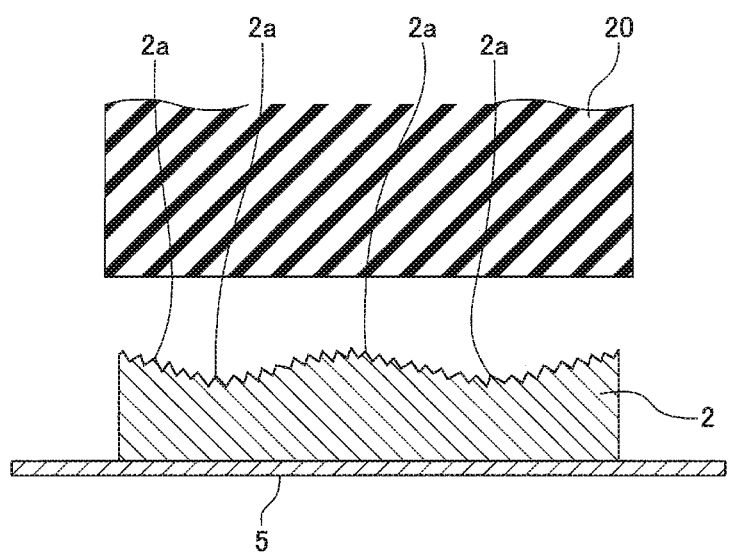
FIG. 3 is a cross-sectional view showing the production method of the all-solid-state battery wherein the state is immediately before pressing the upper surface of the positive electrode film with a pressing body consisting of an elastic body.
Figure 4:
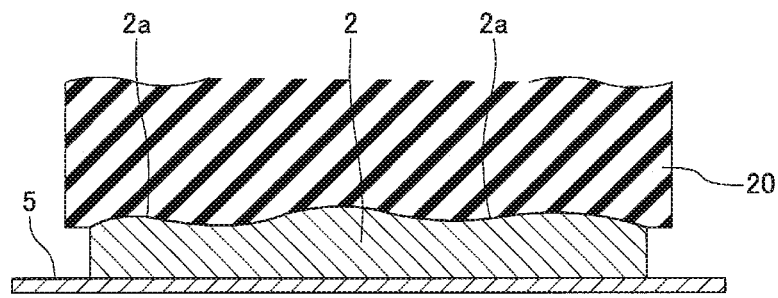
FIG. 4 is a cross-sectional view showing the production method of the all-solid-state battery wherein the upper surface of the positive electrode film is pressed by the pressing body consisting of the elastic body (step of pressing positive electrode film).

The production method (production process) of the all-solid-state battery 1 is described. As shown in FIG. 2, a powder material to be the positive electrode layer (the first layer of pressed powder) 2 is laminated on the positive electrode collector 5 to be formed (step of forming positive electrode film). Then, as shown in FIG. 3 and FIG. 4, the upper surface of the formed positive electrode layer 2 which is the first layer of pressed powder (the upper surface is a surface of the formed film, and also a boundary surface with the sold electrolyte layer 4 in the positive electrode layer 2 on which the solid electrolyte layer 4 is to be laminated thereafter) is pressed by a pressing body (so-called press pin) 20 (step of pressing positive electrode film). Particularly, the pressing body 20 is composed of an elastic body. The elastic body preferably has a modulus of elasticity of 100 MPa or less. The pressing pressure in the step of pressing the positive electrode layer is preferably 10 MPa or less. As a material of an elastic body used as the pressing body 20, for example, a rubber material is preferable, but the invention is not limited thereto.

As shown in FIG. 2, since the positive electrode layer 2 which is the first layer of pressed powder is formed by laminating powder materials (formed into a film), the positive electrode layer 2 thus formed may have the uneven part 2a on the formed film surface. However, even in the case where the uneven part 2a is generated on the formed film surface of the positive electrode layer 2 which is one of the layers of pressed powder and the pressing pressure as described above is relatively low (small), the level difference of the uneven part 2a of the formed film surface of the positive electrode layer 2 can be reduced as shown in FIG. 4, since the pressing body 20 is composed of an elastic body.

Figure 5:
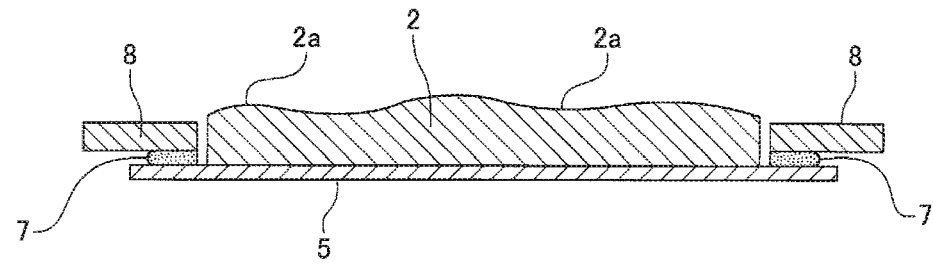
FIG. 5 is a cross-sectional view showing the production method of the all-solid-state battery wherein the insulating material 8 in the side of the positive electrode is fixed to the outer peripheral portion of the positive electrode layer on the upper surface of the positive electrode collector by an adhesive material.

For example, thereafter, as shown in FIG. 5, the insulating material 8 in the side of the positive electrode is fixed to the outer peripheral portion of the positive electrode layer 2 on the upper surface of the positive electrode collector 5 by the adhesive 7. The fixing of the insulating material 8 in the side of the positive electrode may not necessarily be performed at this timing, and in some cases, after the subsequent formation of the solid electrolyte layer 4 or before formation of the positive electrode layer 2, the insulating material 8 in the side of the positive electrode may be fixed.

Figure 6:
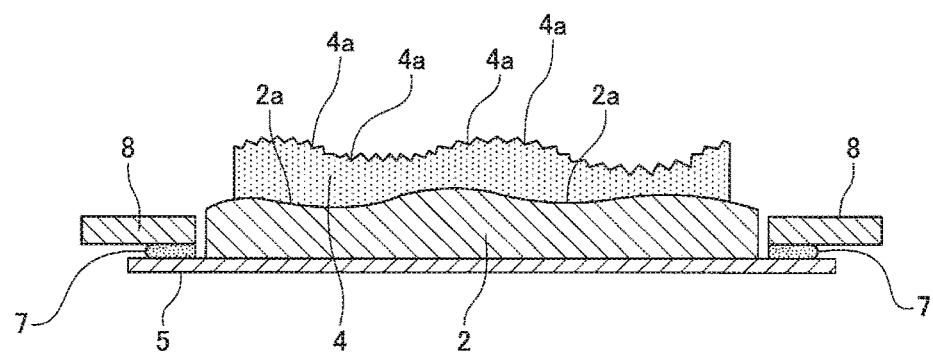
FIG. 6 is a cross-sectional view showing the production method of the all-solid-state battery wherein a powder material for the solid electrolyte layer is laminated and formed on the positive electrode layer (step of forming solid electrolyte film).
Figure 7:
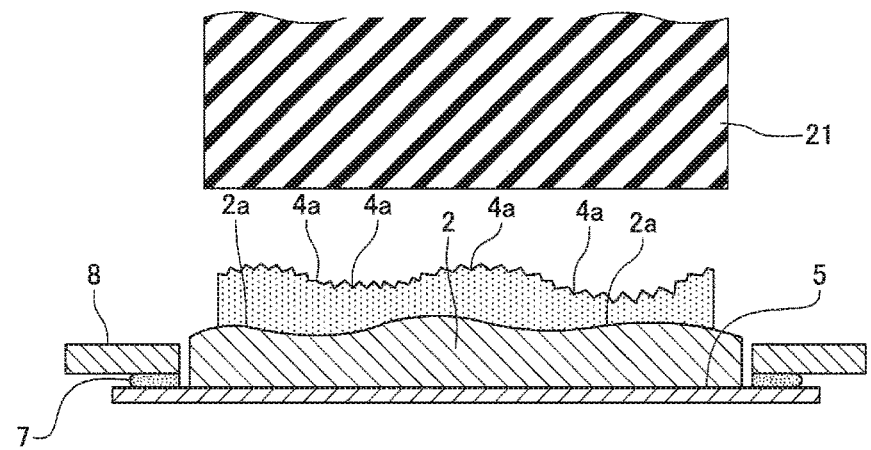
FIG. 7 is a cross-sectional view showing the production method of the all-solid-state battery wherein the state is immediately before pressing the upper surface of the solid electrolyte film with the pressing body consisting of the elastic body.
Figure 8:
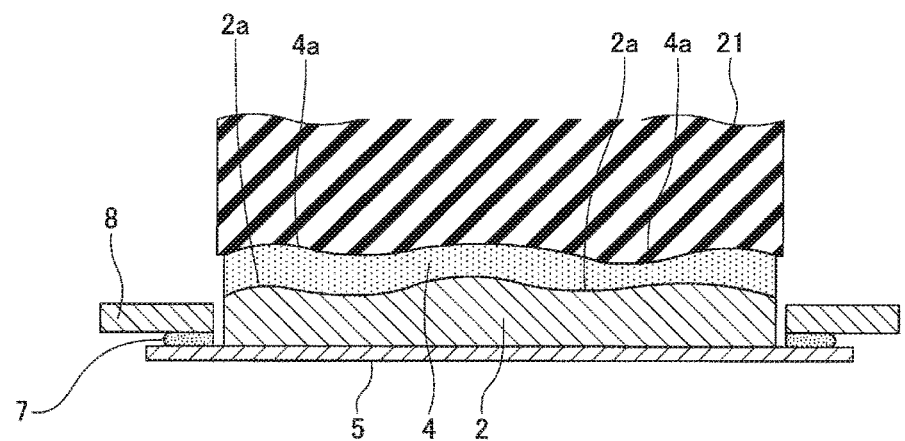
FIG. 8 is a cross-sectional view showing the production method of the all-solid-state battery wherein the upper surface of the solid electrolyte film is pressed by the pressing body consisting of the elastic body (step of pressing solid electrolyte film).

As shown in FIG. 6, a powder material to be the solid electrolyte layer (the second layer of pressed powder) 4 is laminated on the positive electrode layer 2 to be formed (into a film) (step of forming solid electrolyte film). Then, as shown in FIG. 7 and FIG. 8, the upper surface of the formed solid electrolyte layer 4 which is the second powder film (that is, formed film surface, also a boundary surface with the negative electrode layer 3 in the solid electrolyte layer 4 on which the negative electrode layer 3 is to be laminated thereafter) is pressed by a pressing body (so-called press pin) 21 (step of pressing solid electrolyte layer). Particularly, the pressing body 21 is composed of an elastic body. The elastic body forming the pressing body 21 preferably has a modulus of elasticity of 100 MPa or less. The pressing pressure in the step of pressing the solid electrolyte layer is preferably 10 MPa or less. As a material of an elastic body used as the pressing body 21, for example, a rubber material is preferable, but the invention is not limited thereto. As the pressing body 21 pressing the solid electrolyte layer 4, the pressing body 20 pressing the positive electrode aver 2 may also be used.

As shown in FIG. 6, since the solid electrolyte layer 4 which is to be the second layer of pressed powder is also formed by laminating powder materials (formed into a film), the solid electrolyte layer 4 thus formed may generate the uneven part 4a on the formed film surface. However, even in the case where the uneven part 4a is generated on the formed film surface of the solid electrolyte layer 1 which is one of the layers of pressed powder, and the pressing pressure as described above is relatively low (small), the level difference of the uneven part 4a of the formed film surface of the solid electrolyte layer 4 can be reduced as shown in FIG. 8, since the pressing body 21 is also composed of an elastic body.

Figure 9:
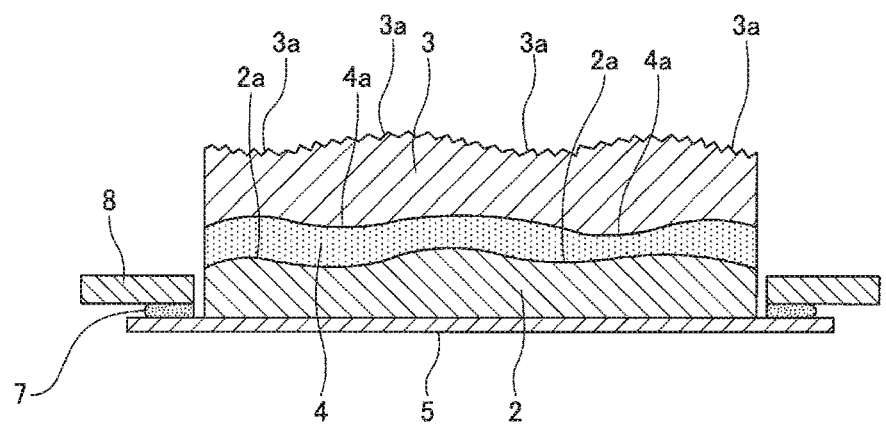
FIG. 9 is a cross-sectional view showing the production method of the all-solid-state battery wherein the negative electrode film is formed on the solid electrolyte layer (step of forming negative electrode FIG. 10 is a cross-sectional view showing the production method of the all-solid-state battery wherein the state is immediately before pressing the upper surface of the negative electrode film with the pressing body consisting of the elastic body.
Figure 10:
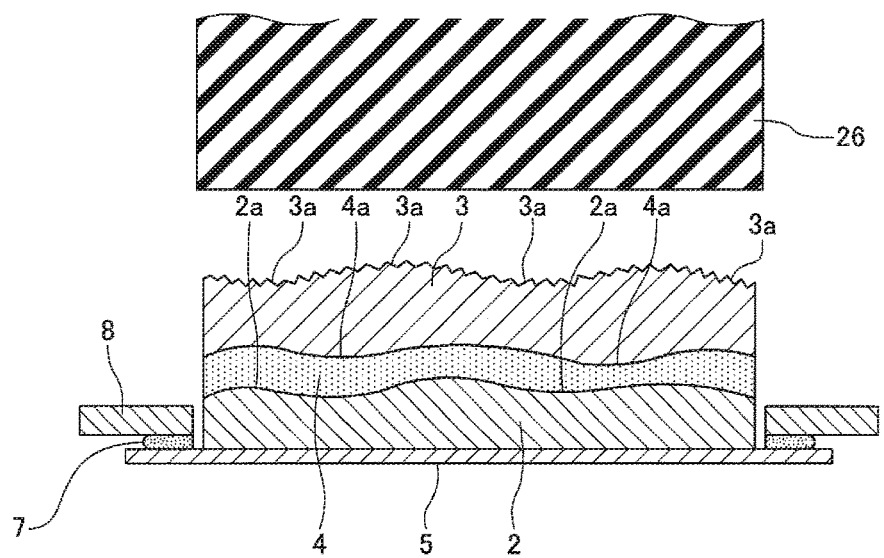
Figure 11:
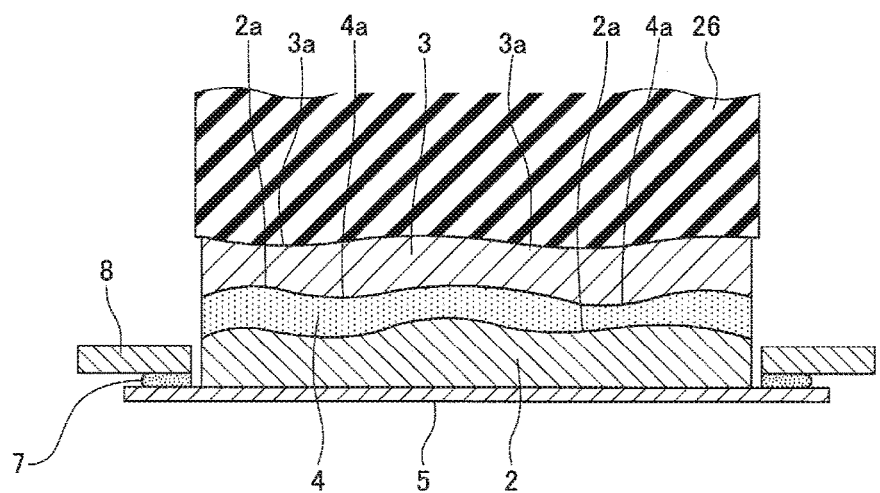
FIG. 11 is a cross-sectional view showing the production method of the all-solid-state battery wherein the upper surface of the negative electrode film is pressed by the pressing body consisting of the elastic body (step of pressing negative electrode film).

As shown in FIG. 9, a powder material to be the negative electrode layer (the third layer of pressed powder) 3 is laminated on the solid electrolyte layer 4 to be formed (into a film) (step of forming negative electrode film). Then, as shown in FIG. 10 and FIG. 11, the upper surface of the formed negative electrode layer 3 which is the third powder film (formed film surface) is pressed by a pressing body (so-called press pin) 26 (step of pressing negative electrode layer (surface)). Particularly, the pressing body 26 is composed of an elastic body. The elastic body forming the pressing body 26 preferably has a modulus of elasticity of 100 MPa or less. The pressing pressure in the step of pressing the negative electrode layer is preferably 10 MPa or less. As a material of an elastic body used as the pressing body 26, for example, a rubber material is preferable, but the invention is not limited thereto. As the pressing body 26 pressing the negative electrode layer 3, the pressing body 20 pressing the positive electrode layer 2 or the pressing body 21 pressing the solid electrolyte layer 4 may also be used.

As shown in FIG. 9, since the negative electrode layer 3 which is the third layer of pressed powder is formed by laminating powder materials (formed into a film), the negative electrode layer 3 thus formed may generate the uneven part 3a on the formed film surface. However, even in the case where the pressing pressure as described above is relatively low (small), the level difference of the uneven part 3a of the film formed surface of the negative electrode layer 3 can be reduced as shown in FIG. 11, since the pressing body 26 is also composed of an elastic body.

Figure 12:
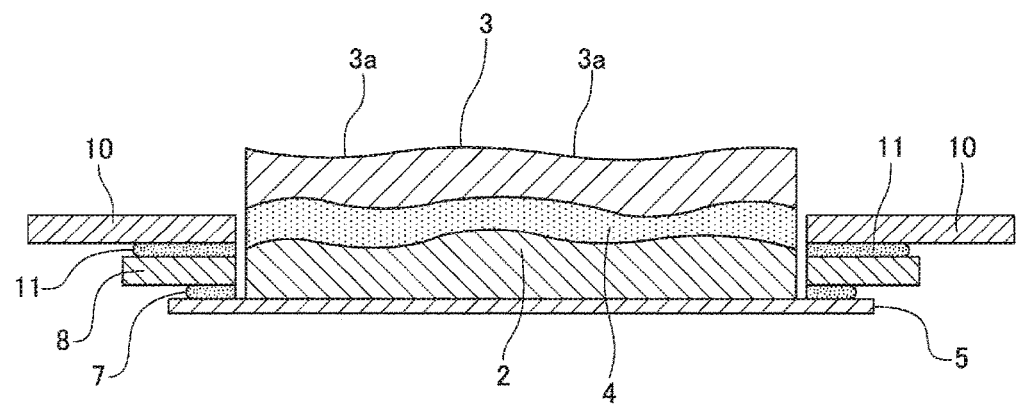
FIG. 12 is a cross-sectional view showing the production method of the all-solid-state battery wherein the insulating material in the side of negative electrode is fixed to the outer peripheral portion of the solid electrolyte layer on the insulating material in the side of the positive electrode through the adhesive layer.

Then, as shown in FIG. 12, the insulating material 10 in the side of the negative electrode is fixed to the outer peripheral portion of the solid electrolyte layer 4 on the insulating material 8 in the side of the positive electrode through the adhesive 11, and the adhesive 9 is provided on the insulating material 10 in the side of the negative electrode. Providing of the adhesive 11, the insulating material 10 in the side of the negative electrode, and the adhesive 9 may be performed after formation of the negative electrode layer 3 as shown in FIG. 12, but it is not limited to this and it may be performed before formation of the negative electrode layer 3.

Finally, the negative electrode collector 6 is set so as to cover the negative electrode layer 3 and the like, and fixed to the insulating material 10 in the side of the negative electrode by the adhesive 9. Thus, the all-solid-state battery 1 shown in FIG. 1 can be produced. When covering with the negative electrode collector 6, it may be integrally formed by press or the like.

According to this production method, the formed film surfaces of the positive electrode layer 2 which is to be the first layer of pressed powder and the solid electrolyte layer 4 which is the second layer of pressed powder and the formed film surface of the negative electrode layer 3 which is to be the third layer of pressed powder are pressed by the pressing bodies 20, 21, and 26 consisting of elastic bodies in the pressing (in this embodiment, the steps of pressing the positive electrode layer, pressing the solid electrolyte layer, and pressing the negative electrode layer). Therefore, even in the case where the uneven parts 2a, 3a, and 4a are generated on the boundary surfaces (formed film surfaces) of the positive electrode layer 2 which is the layer of pressed powder and the solid electrolyte layer 4 or the formed film surface of the negative electrode layer 3 and the pressing pressure is low (small), the pressing operation is performed while the elastic body is elastically deformed so that the level difference of the uneven parts 2a, 3a, and 4a of the formed film surfaces of the layers of pressed powder is reduced. As a result, the level difference of uneven parts 2a, 3a, and 4a of the formed film surface of the layer of pressed powder can be reduced.

That is, the steps of pressing the film for the positive electrode layer and pressing the film for the solid electrolyte layer can contribute to reducing the level difference of the uneven part 2a on the upper surface (formed film surface) of the positive electrode layer 2, in which the upper surface of the positive electrode layer 21 is the boundary surface between the positive electrode layer 2 and the solid electrolyte layer 4, or the level difference of the uneven part 4a on the upper surface (formed film surface) of the solid electrolyte layer 4, in which the upper surface of the solid electrolyte layer 4 is the boundary surface between the solid electrolyte layer 4 and the negative electrode layer 3. Therefore, it is possible to well minimize the variation of thickness of the solid electrolyte layer 4 between the positive electrode layer 2 and the negative electrode layer 3. In addition, the step of pressing the negative electrode layer can contribute to reducing the level difference of the uneven part 3a on the upper surface (formed film surface) of the negative electrode layer 3, allowing to indirectly suppress the variation of the thickness of the solid electrolyte layer 4 between the positive electrode layer 2 and the negative electrode layer 3 due to this level difference when the negative electrode collector 6 is covered on the negative electrode layer 3. Furthermore, there is an advantage that the contact state between the negative electrode layer 3 and the negative electrode collector 6 can become better.

For example, it is possible to suppress the generation of dendrite (tree-like crystal) due to lithium concentration on the convex portion. As a result, even when the pressing force in the pressing reduced, the variations of the thicknesses of the positive electrode layer 2, the solid electrolyte layer 4, and the negative electrode layer 3 can be well minimized. As a result, it is possible to prevent the occurrences of short circuit and charge abnormality due to the generation of dendrite.

Since the pressing force can be made small in the step of pressing the surface of each formed powder film, the occurrence of curvature of the integrally formed layers of pressed powder (the positive electrode layer 2, the solid electrolyte layer 4 and the negative electrode layer 3) can be minimized, allowing to prevent cracking of the formed powder layer (the positive electrode layer 2, the solid electrolyte layer 4 and the negative electrode layer 3) due to deformation.

Figure 13:
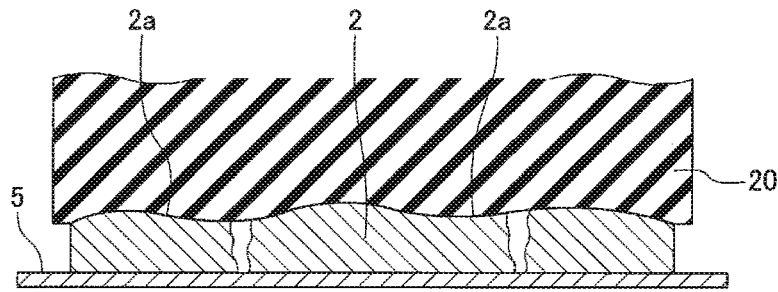
FIG. 13 is a cross-sectional view showing the production method of the all-solid-state battery wherein the state, in which the layer of pressed powder (positive electrode layer) consisting of a powder material is stretched in the transverse direction when pressed and the powder material collapses, is briefly shown.
Figure 14:
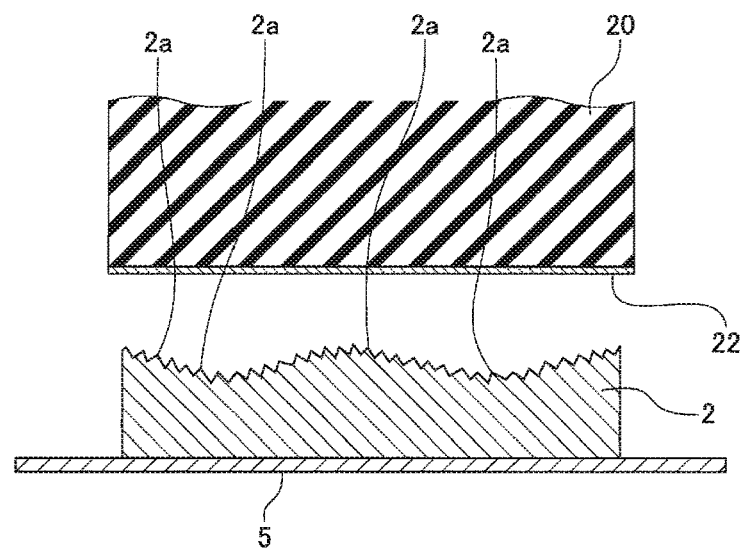
FIG. 14 is a cross-sectional view showing the production method of the all-solid-state battery according to the other embodiment of the present invention wherein the state is immediately before pressing the upper surface of the positive electrode film with the pressing body consisting of the elastic body provided with a surface sheet.
Figure 15:
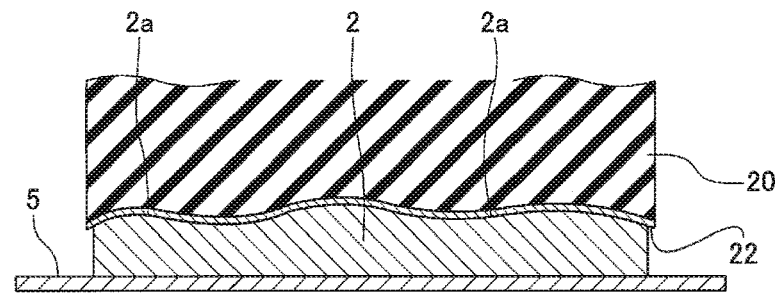
FIG. 15 is a cross-sectional view showing the production method of the all-solid-state battery wherein the upper surface of the positive electrode film is pressed by the pressing body consisting of the elastic body provided with the surface sheet (step of pressing positive electrode film).
Figure 16:
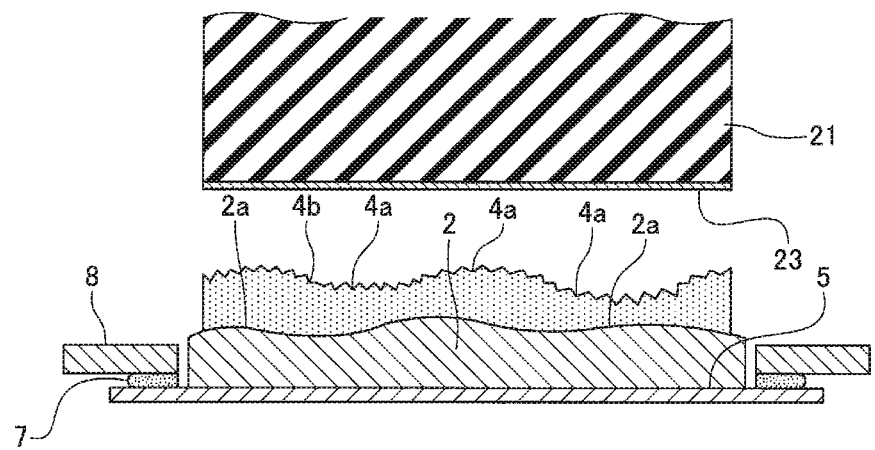
FIG. 16 is a cross-sectional view showing the production method of the all-solid-state battery wherein the state is immediately before pressing the upper surface of the solid electrolyte film with the pressing body consisting of the elastic body provided with the surface sheet.
Figure 17:
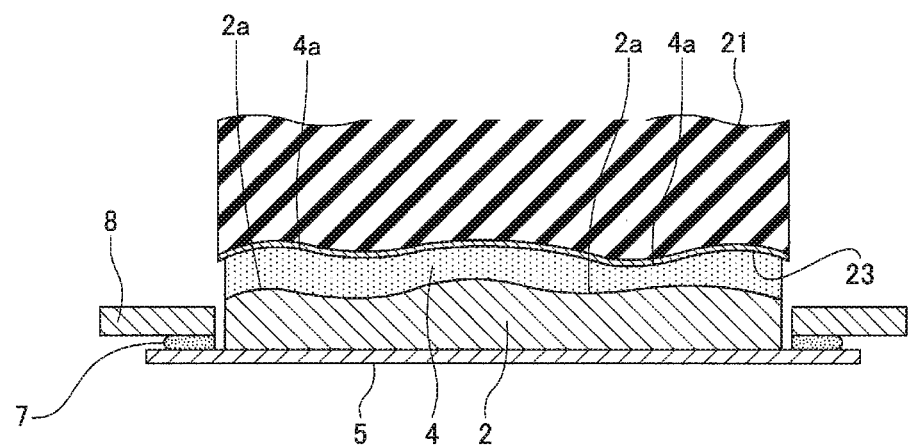
FIG. 17 is a cross-sectional view showing the production method of the all-solid-state battery wherein the upper surface of the solid electrolyte film is pressed by the pressing body consisting of the elastic body provided with the surface sheet (step of pressing solid electrolyte film).
Figure 18:
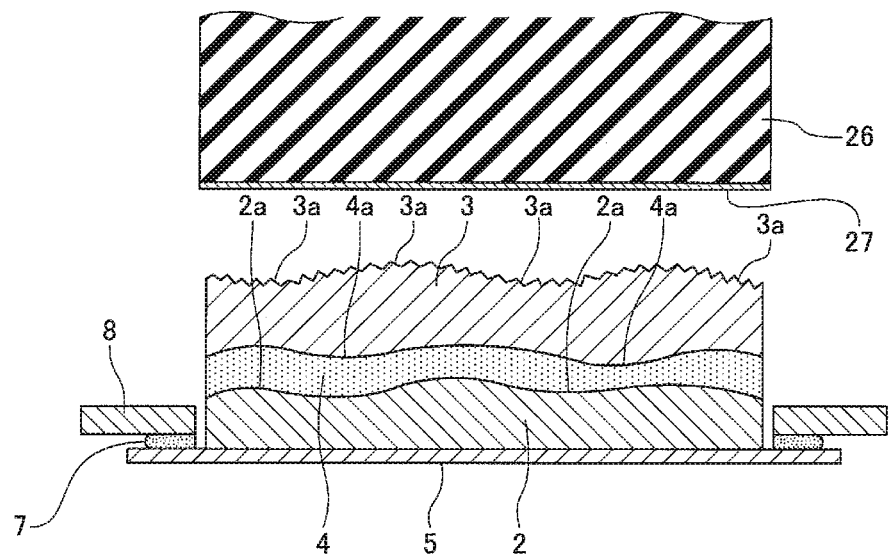
FIG. 18 is a cross-sectional view showing the production method of the all-solid-state battery wherein the state is immediately before pressing the upper surface of the negative electrode film with the pressing body consisting of the elastic body provided with the surface sheet.
Figure 19:
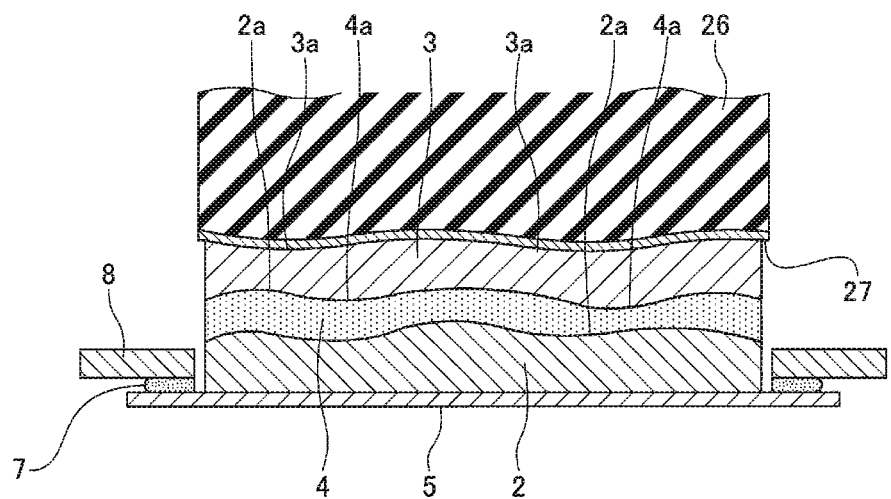
FIG. 19 is a cross-sectional view showing the production method of the all-solid-state battery wherein the upper surface of the negative electrode film is pressed by the pressing body consisting of the elastic body provided with the surface sheet (step of pressing negative electrode film).

When the pressing bodies 20, 21 and 26 consisting of elastic bodies have very low (small) modulus of elasticity, the pressing bodies 20, 21, and 26 themselves are likely to spread (to stretch) in the transverse direction (direction orthogonal to the pressing direction) when pressed. Therefore, in some cases, the layer of pressed powder (the positive electrode layer 2, the solid electrolyte layer 4 and/or the negative electrode layer 3) consisting of a powder material may be stretched in the transverse direction when pressed and the powder material may be collapsed (briefly shown in FIG. 13). In this case, there may be a problem of reduced performance of the all-solid-state battery.

Therefore, in order to prevent the occurrence of such a problem, as shown in FIG. 14 to FIG. 19, surface sheets 22, 23, and 27 having a lower stretchability than the elastic body is provided on the surface, that is to be brought into contact with the layer of pressed powder (the positive electrode layer 2, the solid electrolyte layer 4 and/or the negative electrode layer 3), of the pressing bodies 20, 21, and 26 consisting of the elastic body. The powder film may be pressed by the elastic body provided with the surface sheets 22, 23 and 27 in the above pressing. As a material of the surface sheets 22, 23 and 27, a metal foil such as stainless steel, copper, or aluminum is preferably used, but the invention is not limited thereto. The thickness of the surface sheet is preferably 100 μm or less.

Thus, the film to be the layer of pressed powder (the positive electrode layer 2, the solid electrolyte layer 4 and the negative electrode layer 3) consisting of a powder material is pressed by the pressing bodies 20, 21, and 26 consisting of the elastic body provided with the surface sheets 22, 23 and 27 having a lower stretchability than the elastic body on the surface of the elastic body. Thereby, it becomes hard to stretch due to restriction by the surface sheets 22, 23, and 27 of expansion of the elastic body in a direction orthogonal to the pressing direction (when the pressing direction longitudinal direction, the direction is transverse direction orthogonal to the longitudinal direction) when pressed in the pressing as shown in FIG. 14 to FIG. 19. The layer of pressed powder (the positive electrode layer 2, the solid electrolyte layer 4 and the negative electrode layer 3) consisting of a powder material is prevented from stretching (expanding) in the transverse direction when pressed, leading to no collapse of the powder material.

For example, even when static electricity is left in the layer of pressed powder by forming a film in a state where static electricity is applied, use of the metal foil as the surface sheets 22, 23, and 27 also provides the influence of removing this static electricity by the metal foil.

Figure 20:
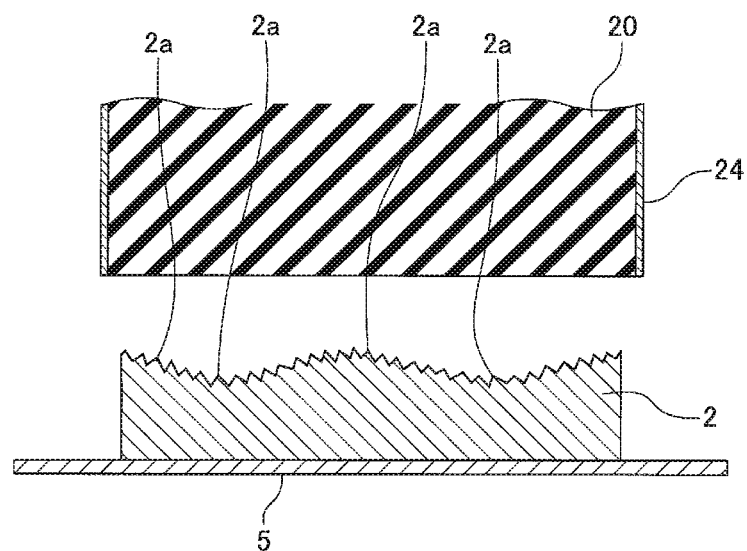
FIG. 20 is a cross-sectional view showing the production method of the all-solid-state battery according to still other embodiment of the present invention wherein the state is immediately before pressing the upper surface of the positive electrode film with a pressing body consisting of the elastic body surrounded by an outer perimeter enclosure.
Figure 21:
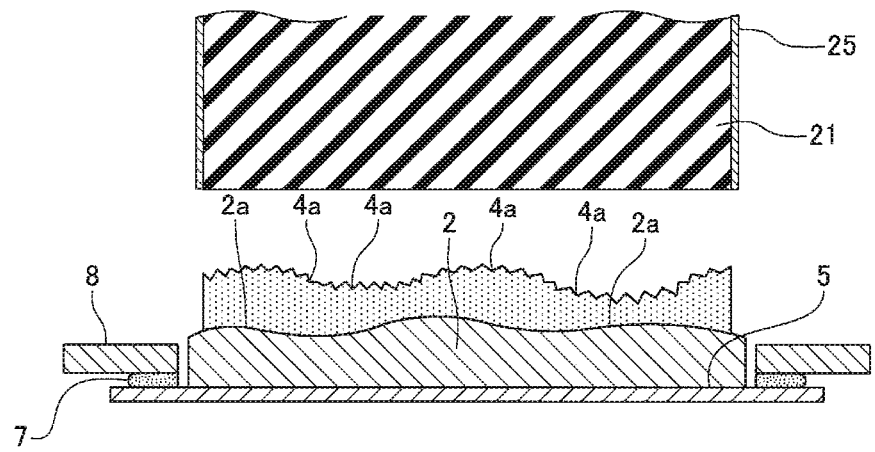
FIG. 21 is a cross-sectional view showing the production method of the all-solid-state battery wherein the state is immediately before pressing the upper surface of the solid electrolyte film with the pressing body consisting of the elastic body surrounded by the outer perimeter enclosure.
Figure 22:
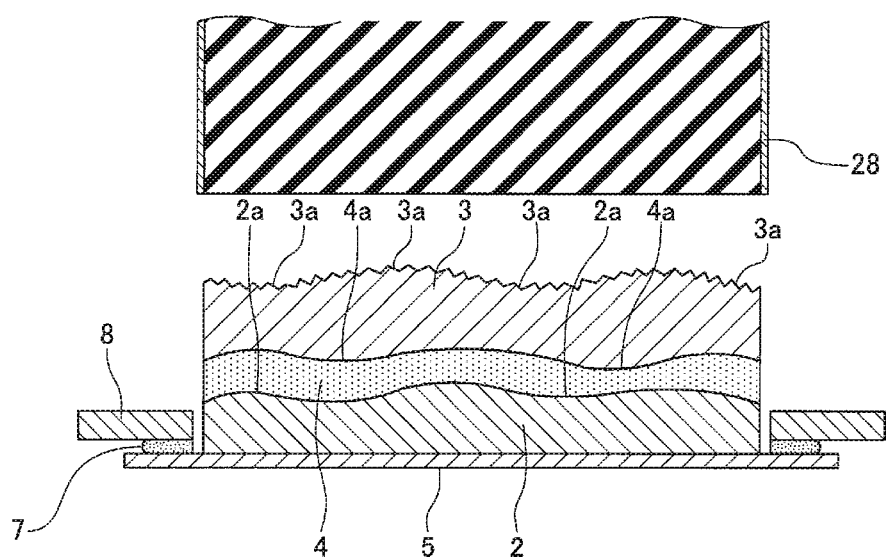
FIG. 22 is a cross-sectional view showing the production method of the all-solid-state battery wherein the state is immediately before pressing the upper surface of the negative electrode film with the pressing body consisting of the elastic body surrounded by the outer perimeter enclosure.
Figure 23:
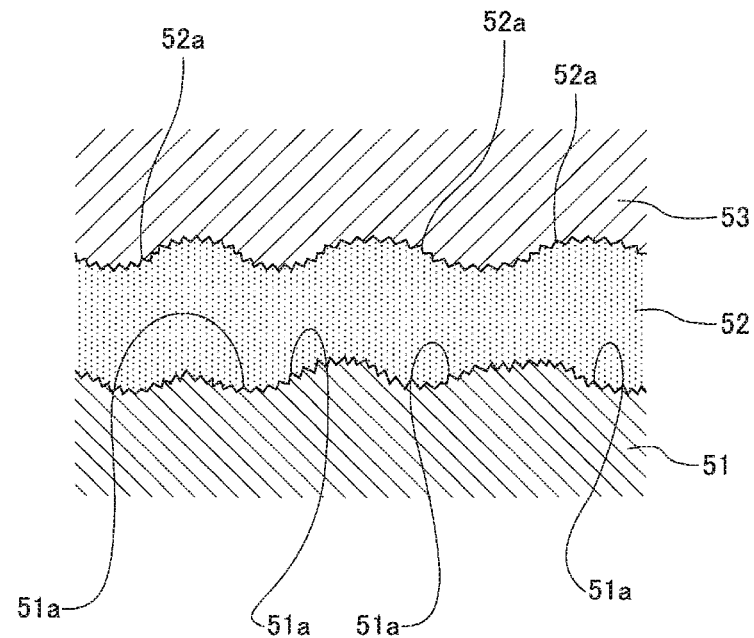
FIG. 23 is a cross-sectional view of a conventional all-solid-state battery.
Figure 24:
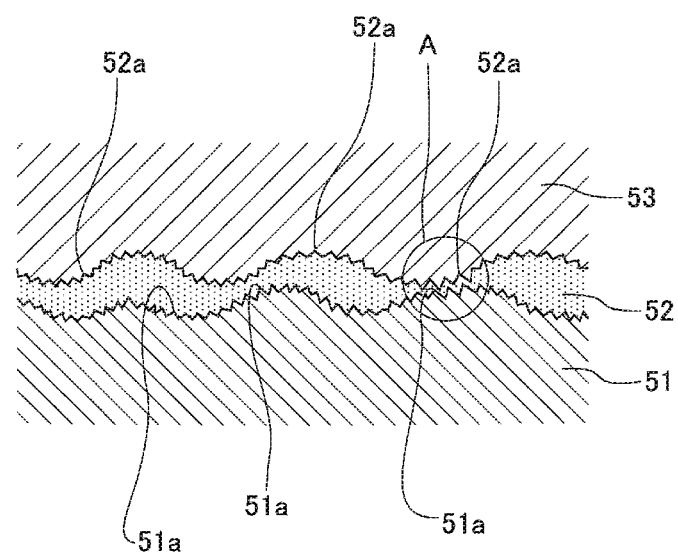
FIG. 24 is a cross-sectional view of the conventional all-solid-state battery wherein the solid electrolyte layer is thin (thickness is small).
Figure 25:
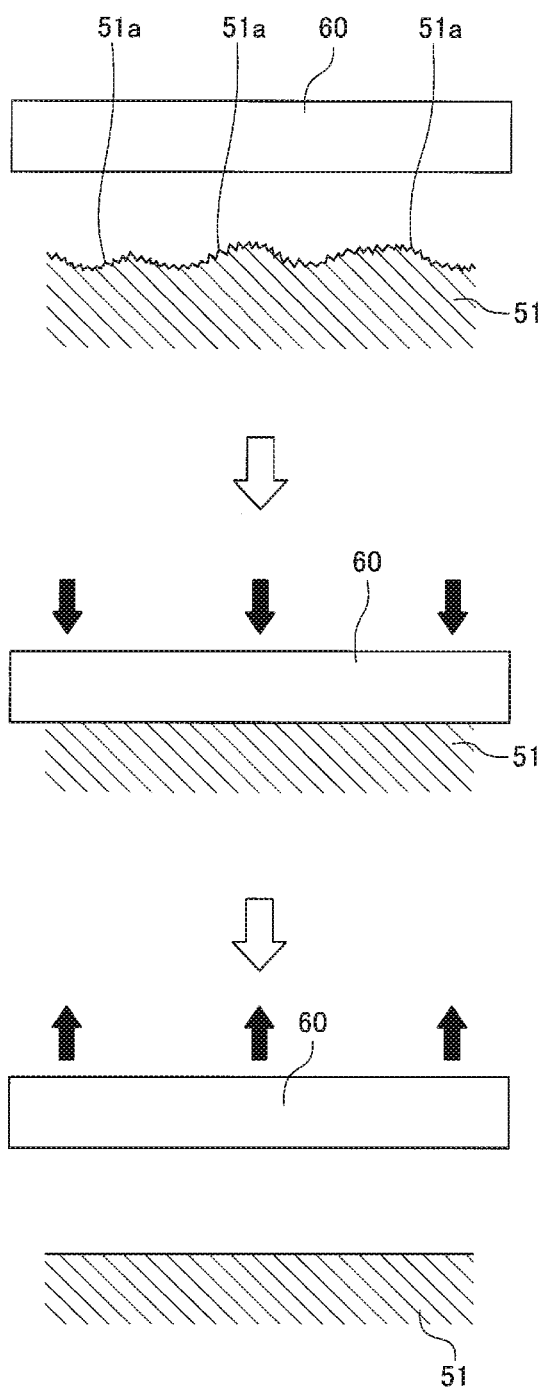
FIG. 25 is a cross-sectional view of the conventional all-solid-state battery wherein the state, in which the positive electrode film is pressed by the pressing body with a large pressure, is shown step by step.
Figure 26:
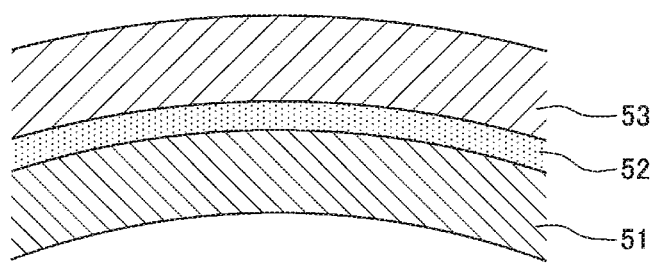
FIG. 26 is a cross-sectional view of the conventional all-solid-state battery wherein the state, in which the positive electrode film, the solid electrolyte film, and the negative electrode film are pressed by the pressing body with a large pressure and deformed into a curved shape, is briefly shown.
Figure 27:
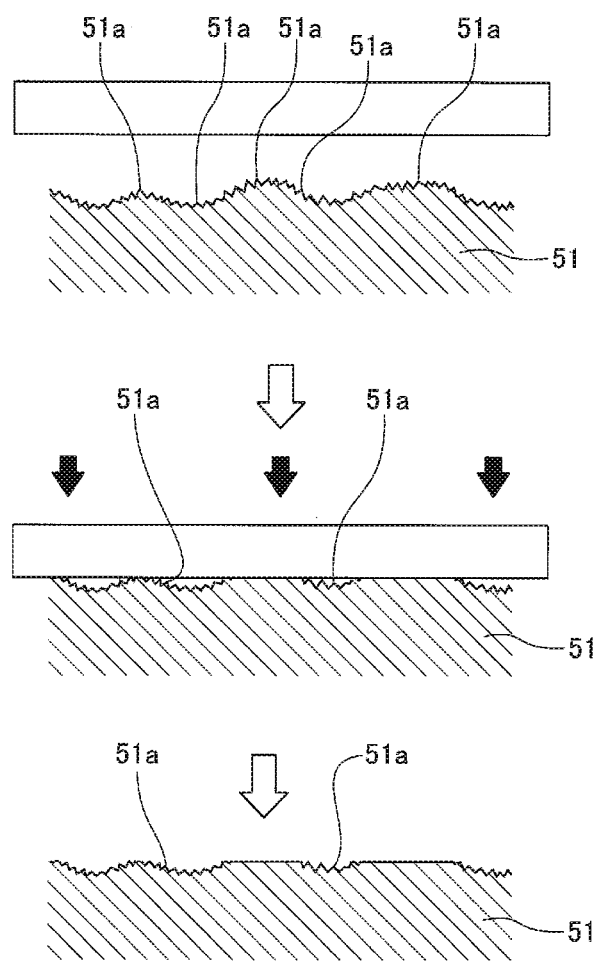
FIG. 27 is a cross-sectional view of the conventional all-solid-state battery wherein the state, in which the positive electrode film is pressed by the pressing body with a small pressure, is shown step by step.

Instead of providing the surface sheets 22, 23, and 27 having a lower stretchability than the elastic body on the surface that is brought into contact with the layer of pressed powder (the positive electrode layer 2, the solid electrolyte layer 4 and the negative electrode layer 3) of the pressing bodies 20, 21 and 26 consisting of the elastic body, outer perimeter enclosures 24, 25 and 28 may be provided, as shown in FIG. 20 to FIG. 22, to surround the elastic body from the outer periphery (the entire outer periphery). In this case, pressing may be performed with the elastic body surrounded by the outer perimeter enclosures 24, 25, and 28. It is preferable to use a material having a stretchability lower than that of the elastic body also for the outer perimeter enclosures 24, 25 and 28. Thus, in the case of pressing with the elastic body surrounded by the outer perimeter enclosures 24, 25 and 28, the elastic body becomes hard to stretch in a direction orthogonal to the pressing direction (when the pressing direction is longitudinal direction, the direction is transverse direction orthogonal to the longitudinal direction) due to restriction of expansion of the elastic body by the outer perimeter enclosures 24, 25 and 28. Therefore, the layer of pressed powder consisting of a powder material is prevented from stretching (expanding) in the transverse direction when pressed, leading to no collapse of the powder material.

The metal foil may be used as the outer perimeter enclosures 24, 25 and 28, and in this case, for example, even when static electricity is left in the layer of pressed powder by film formation in a state where static electricity was applied, the effect of being capable of removing this static electricity by the metal foil is exhibited.

Hereinafter, Examples specifically showing the production method of the all-solid-state battery of the above embodiment are described.

In the present example, etched aluminum having a thickness of 20 μm was used as the positive electrode collector 5. As the positive electrode layer 2, $LiNi_{0.8}Co_{0.15}Al_{0.05}O_2$ was used as a positive electrode active material, and as a positive electrode mixture, lithium ion conductive solid electrolyte of $Li_2S$ (80 mol %)—$P_2S_5$ (20 mol %) was used, and a mixed material was used in which the positive electrode active material and the solid electrolyte were mixed at a mass ratio of 7:3.

This positive electrode layer 2 was formed into a film (formed in a layer) on the positive electrode collector 5 by electrostatic screen printing so as to obtain a square with a side length of 50 mm and a thickness of 100 μm after pressing (press). After film formation, an elastic pressing body 20 consisting of silicone rubber having a modulus of elasticity of about 40 MPa was pressed with a pressing force of several MPa to smooth the surface of the film and bring almost flat shape. In this case, the surface sheet 22, consisting of stainless-steel foil with a thickness of several μm and having a lower stretchability than the elastic body, was provided on the surface of the pressing body 20.

As the solid electrolyte layer 4, $Li_2S$ (80 mol %)—$P_2S_5$ (20 mol %) of the same lithium ion conductive solid electrolyte as that described above was used. The solid electrolyte layer 4 consisting of the lithium ion conductive solid electrolyte of the above material was formed into a film (formed in layer) on the positive electrode layer 2 so as to obtain a square size with a side length of 54 mm and a thickness of 75 μm after pressing (press). After film formation, the pressing was performed with a pressing force of several MPa by the pressing body 21 (the same as the pressing body 20) to smooth the surface of the solid electrolyte layer 4 and bring it almost flat shape.

On the other hand, as the negative electrode layer 3, graphite is used as a negative electrode active material, and $Li_2S$ (80 mol %)—$P_2S_5$ (20 mol %) of the lithium ion conductive solid electrolyte was used as a negative electrode mixture, and a mixed material was used in which the negative electrode active material and the solid electrolyte were mixed at a mass ratio of 6:4. This negative electrode layer 3 was formed into a film (formed in layer) on the solid electrolyte layer 4 so as to obtain a square with a side length of 52 mm and a thickness of 100 μm after pressing (press). After formation of all the layers of pressed powder as described above, a pressure of several t/cm$^2$ was applied to form (mold) the all-solid-state battery 1.

When charging and discharging the all-solid-state battery 1 produced in this manner and the all-solid-state battery as a comparative example in which the pressing by the elastic body was omitted, the ratio of the number of batteries which could be charged and discharged was 25% in the all-solid-state battery in the comparative example, and was 75% in the all-solid-state battery 1 in the present Example. Thus, the success rate of charge and discharge was able to be confirmed to be greatly improved.

In the above description, it has been described that the pressing bodies 20, 21, and 26 as elastic bodies preferably have a modulus of elasticity of 100 MPa or less. The lower the modulus of elasticity of the pressing bodies 20, 21, and 26 as elastic bodies, the better the followability to the uneven shape, but irregularity (difference) easily occurs in the thickness of the layer of pressed powder (the positive electrode layer 2, the solid electrolyte layer 4 and/or the negative electrode layer 3). Therefore, the lower limit of the modulus of elasticity is preferably 5 MPa or more, although is influenced by the thickness of the pressing bodies 20, 21 and 26. A further preferable range of the modulus of elasticity is 50 MPa or less, which causes no irregularity (difference) in the thickness of the layer of pressed powder (the positive electrode layer 2, the solid electrolyte layer 4 and/or the negative electrode layer 3) to be pressed. That is, a further preferable modulus of elasticity of the pressing body 20 is 5 MPa or more and 50 MPa or less (that is, 5 MPa to 50 MPa).

In the above description, it has been described that the pressing pressure in the steps of pressing the films of powder (to be the positive electrode layer 2, the solid electrolyte layer 4 and/or the negative electrode layer 3) is preferably 10 MPa or less. When the layer of pressed powder is not hardened to a certain degree of hardness in pressing, the press pins which are the pressing bodies 20, 21, and 26 are released after pressing and then the layer of pressed powder adheres to the pressing bodies 20 and 21. Thus, the lower limit value of the pressing pressure is preferably 0.1 MPa or more (when the modulus of elasticity of the pressing bodies 20, 21, and 26 as elastic bodies is 40 MPa). That is, the pressing pressure in the pressing is preferably 0.1 MPa or more and 10 MPa or less. The higher the pressing pressure is in the range of 10 MPa or less when pressed, the better the effect can be obtained, but depending on the type of the current collector and/or the powder material, the current collector may be deformed or broken, or the solidified layer of pressed powder may be collapsed. Thus, in order to prevent such a problem, the pressing pressure and the modulus of elasticity of the pressing bodies 20, 21, and 26 as elastic bodies are required to be lower. Therefore, the pressing pressure more preferably around 4 MPa, and particularly preferably the pressing pressure is 0.1 MPa or more and 5 MPa or less (that is, 0.1 MPa to 5 MPa).

It is assumed that since the obtained effect of the pressing by the pressing body 20 becomes more significant with easier deformation of the layer of pressed powder, the obtained effect of the pressing becomes more significant with the larger ratio of the solid electrolyte with respect to the active material. For example, preferably, the mass ratio of the positive electrode active material to solid electrolyte is 8:2 to 4:6 and the weight ratio of the negative electrode active material to the solid electrolyte is 6:4 to 4:6, but the invention is not limited thereto.

Concerning to the surface sheets 22, 23, and 27 having lower stretchability than that of the elastic body, provided on the surface of the pressing body 20 consisting of the elastic body in contact with the layer of pressed powder, for example, one having a modulus of elasticity more than twice as high as that of the pressing body 20, such as a modulus of elasticity of 200 MPa, is more preferable. For example, the modulus of elasticity of metal foils such as stainless steel, copper, and aluminum foils as the surface sheets 22, 23, and 27, used as described above, was 70 GPa or more (that is, 700 times or more of the modulus of elasticity of the pressing body 20 consisting of the elastic body), but the invention is not limited thereto.

The above embodiments has described that the positive electrode layer 2 is formed (formed in layers) on the positive electrode collector 5 by electrostatic screen printing, but the invention is not limited thereto. Methods other than electrostatic screen printing, for example, known film forming methods, in which the film is made of powder, such as electrostatic coating and electrostatic printing may be used. As a method of forming the solid electrolyte layer 4 into a film on the positive electrode layer 2 or a method of forming the negative electrode layer 3 into a film on the solid electrolyte layer 4, known film forming methods, in which the film is made of powder, such as electrostatic screen printing, electrostatic coating, and electrostatic printing may be used, but the present invention is not limited thereto.

As described in the above embodiments, both the positive electrode layer 2 and the solid electrolyte layer 4 are formed by forming a powder film and then the film is pressed by the elastic body, and thus each layer of pressed powder (the positive electrode layer 2, the solid electrolyte layer 4 and the negative electrode layer 3) is formed and then more preferably pressed with an elastic body. However, the invention is not limited thereto, and even when the pressing operation after forming the powder film (at least one to be the positive electrode layer 2, the solid electrolyte layer 4 and/or the negative electrode layer 3) is performed on any one or two powder films, the level difference of the uneven part on the surface of the layer of pressed powder can be reduced compared to the case where none of the powder films are pressed, and hence the possibility of occurrence of short circuit and/or charging abnormality is assumed to be reduced.

As described in the above embodiments, all the layers (the positive electrode layer 2, the solid electrolyte layer 4 and the negative electrode layer 3) are formed by a powder material, but the invention is not limited thereto. When only some of the films (to be the positive electrode layer 2, the solid electrolyte layer 4 and/or the negative electrode layer 3) are formed by a powder material, only this powder film (or these powder films) may be pressed by an elastic body.

As described in the above embodiments, the positive electrode layer 2 is formed on the positive electrode collector 5 and pressed by the elastic body, then the solid electrolyte layer 4 is formed and pressed by the elastic body, and then the negative electrode layer 3 is formed and pressed by the elastic body, but the invention is not limited thereto. Of course, it can be performed in the same manner that the negative electrode layer is formed on the negative electrode collector and pressed by the elastic body, then the solid electrolyte layer is formed and pressed by the elastic body, and then the positive electrode layer is formed and pressed by the elastic body.

All portion of the each pressing body 20, 21 or 26 may be composed of elastic body, or some portion of the each pressing body may be composed of elastic body, as long as the portion by which the layer of pressed powder is pressed is composed of an elastic body.

The invention claimed is:

1. A production method of an all-solid-state battery wherein a solid electrolyte layer is arranged between a positive electrode layer and a negative electrode layer and current collectors are arranged on the positive electrode layer and the negative electrode layer respectively, the method comprising:
    forming a first powder film for constituting one of the positive electrode layer and the negative electrode layer;
    pressing a surface of the first powder film by a first elastic pressing body to form a first layer, the first layer being one of the positive electrode layer and the negative electrode layer;
    subsequently forming, on the first layer, a second powder film for constituting the solid electrolyte layer, the second powder film being different from the first powder film; and
    pressing a surface of the second powder film by a second elastic pressing body to form a second layer, the second layer being the solid electrolyte layer, the second elastic pressing body being either the same as or different from the first elastic pressing body.

2. The production method of the all-solid-state battery according to claim 1, wherein the first elastic pressing body includes an elastic body,
    wherein a surface sheet having a lower stretchability than the elastic body is provided on a surface of the first elastic pressing body, the surface sheet of the first elastic pressing body brought into contact with the first powder film during the step of pressing of the surface of the first powder film, and
    wherein, in the step of pressing of the surface of the first powder film, the pressing is performed by the first elastic pressing body provided with the surface sheet.

3. The production method of the all-solid-state battery according to claim 1, wherein an outer perimeter enclosure surrounding an outer periphery of the first elastic pressing body is provided, and
    wherein, in the step of pressing of the surface of the first powder film, the pressing is performed by the first elastic pressing body surrounded by the outer perimeter enclosure.

4. The production method of the all-solid-state battery according to claim 1, wherein a modulus of elasticity of the first elastic pressing body is 100 MPa or less.

5. The production method of the all-solid-state battery according to claim 1, wherein a pressing pressure in the step of pressing of the surface of the first powder film is 10 MPa or less.

6. The production method of the all-solid-state battery according to claim 2, wherein the surface sheet is a metal foil.

7. The production method of the all-solid-state battery according to claim 2, wherein a thickness of the surface sheet is 100 µm or less.

8. The production method of the all-solid-state battery according to claim 1, wherein the first powder film is formed for constituting the positive electrode layer, and the second powder film is formed for constituting the solid electrolyte layer.

9. The production method of the all-solid-state battery according to claim 1, wherein a modulus of elasticity of the first elastic pressing body is 5 MPa or more and 50 MPa or less.

10. The production method of the all-solid-state battery according to claim 1, further comprising:
- subsequently forming, on the second layer, a third powder film for constituting the other of the positive electrode layer and the negative electrode layer; and
- pressing a surface of the third powder film by a third elastic pressing body to form a third layer, the third layer being the other of the positive electrode layer and the negative electrode layer, the third elastic pressing body being either the same as the first elastic pressing body or the second elastic pressing body or different from any of the first elastic pressing body or the second elastic pressing body.

* * * * *